United States Patent [19]

Randall

[11] 4,112,397

[45] Sep. 5, 1978

[54] X-RAY TUBE ARRANGEMENT

[75] Inventor: Robert Paul Randall, Uxbridge, England

[73] Assignee: EMI Limited, Hayes, England

[21] Appl. No.: 814,334

[22] Filed: Jul. 11, 1977

[30] Foreign Application Priority Data

Aug. 14, 1976 [GB] United Kingdom ............... 33903/76

[51] Int. Cl.[2] ............................................. G03B 41/16

[52] U.S. Cl. .................................... 250/401; 250/403; 250/445 T

[58] Field of Search ............... 250/401, 402, 403, 404, 250/405, 355, 397, 445 T

[56] References Cited

U.S. PATENT DOCUMENTS

| | | | |
|---|---|---|---|
| 2,946,892 | 7/1960 | Bas-Taymay | 250/404 |
| 3,838,284 | 9/1974 | McIntyre | 250/397 |

*Primary Examiner*—Craig E. Church
*Attorney, Agent, or Firm*—Cooper, Dunham, Clark, Griffin & Moran

[57] ABSTRACT

In an X-ray tube arrangement of the kind in which an electron beam is deflected along a target/anode there is provided means for monitoring the progress of the deflection to correct for errors. Detectors are provided to receive radiation from the regions of intended reversals in the scan. By monitoring maxima and minima in the waveform from those detectors the true position of the reversals can be estimated.

5 Claims, 6 Drawing Figures

X-RAY TUBE ARRANGEMENT

The present invention relates to X-ray tube arrangements, and it relates especially to such arrangements in which the X-ray tube incorporates an elongated target-/anode member over which an electron beam can be deflected to cause X-rays to be emitted from different positions along said member.

In the Specification of U.S. Pat. No. 4,010,370 and U.S. patent application Ser. No. 733,941 there are described computerised axial tomographic scanners which utilise arrangements of the kind described above. In such scanners, the X-ray tube is rotated around a patient to project radiation through a slice of the patient from many different directions. The aforementioned deflection of the electron beam is superimposed upon the rotational movement and is effected repeatedly at a frequency much higher than that of the rotational movement. In such cases, a difficulty arises in accurately adjusting the amplitude to the deflection of said electron beam, which has to be strictly determined in order that the positions of beam paths along which the radiation is projected through the patient are known with accuracy.

In U.S. application Ser. No. 799,712 there is described an X-ray tube arrangement of the kind in which the electron beam of the tube is deflected repeatedly along the target/anode member thereof and which includes means for monitoring said deflection and for correcting the deflection if it is in error.

It is an object of this invention to provide an arrangement of that kind including an alternative monitoring and correcting means.

According to the present invention there is provided an X-ray tube arrangement including an anode, means for generating an electron beam and directing it to be incident on said anode to generate X-rays at the region of incidence, means for deflecting the electron beam to scan repetitively the region of incidence between two positions at which the deflection is reversed, monitoring means arranged to monitor the intensity of X-rays emitted at two points on the anode in the vicinity of each of which a reversal is intended to occur and means for operating on the output of each monitoring means to estimate the variation of the position of the respective reversal from its intended position.

Figure 1:
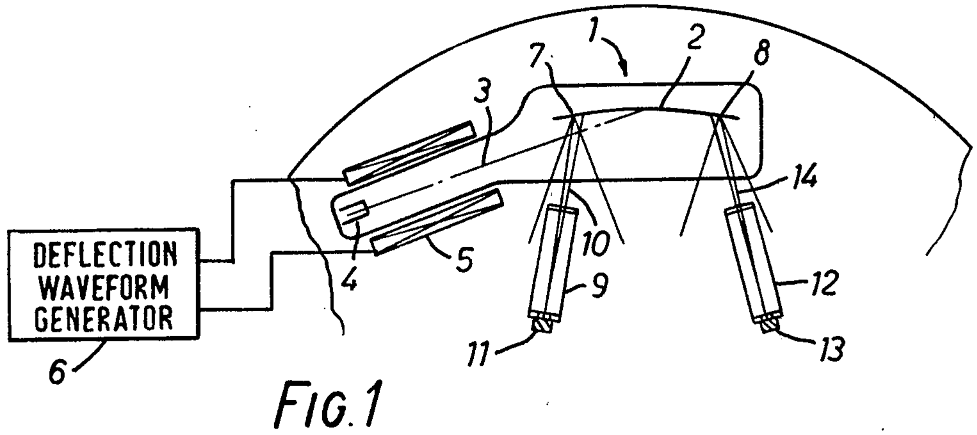
Figure 2A:
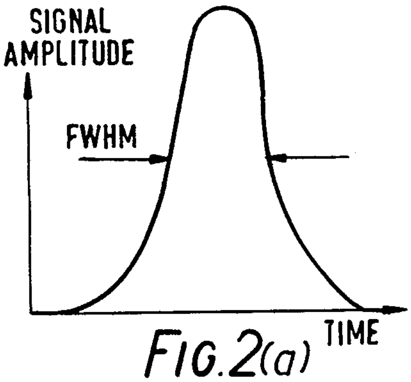
Figure 2B:
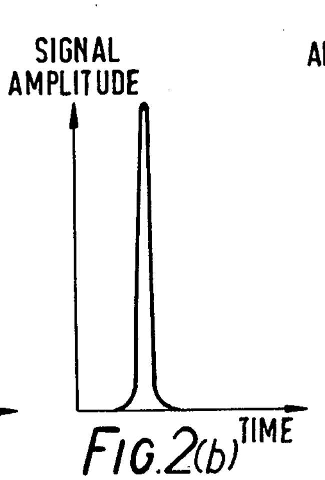
Figure 2C:
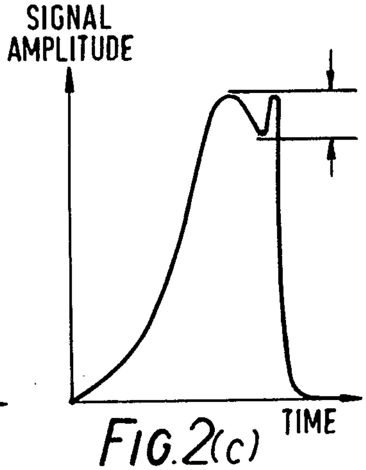
Figure 2D:
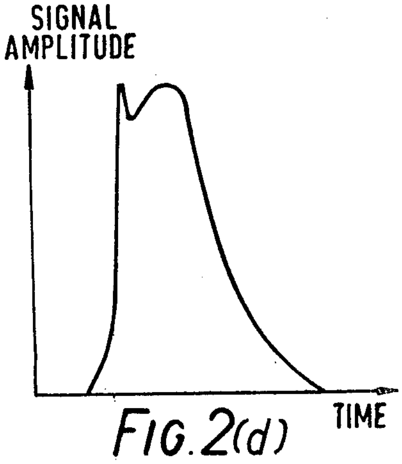
Figure 3:
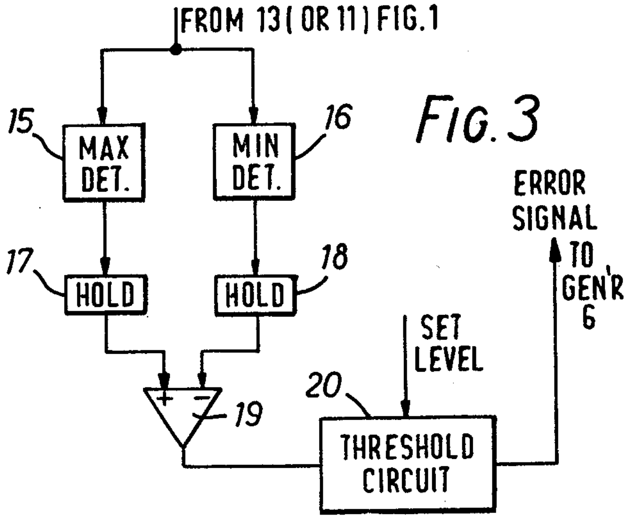

In order that the invention may be clearly understood and readily carried into effect, one embodiment thereof will now be described, by way of example only, with reference to the accompanying drawings of which:

FIG. 1 shows, in schematic form, part of an arrangement in accordance with one example of the invention, FIGS. 2(*a*) through 2(*d*) show waveforms which can be derived from the arrangement of FIG. 1, and FIG. 3 shows, in block diagrammatic form, an electrical circuit for use with the arrangement of FIG. 1.

Referring now to the drawings, an X-ray tube 1 contains an elongated target/anode member 2 over which an electron beam 3, which emanates from a cathode 4, can be deflected by means of deflection coils 5 under the influence of deflection waveform generating circuits 6. Instead of deflection coils, deflection plates disposed internally of the tube 1 could be used. The extremities of the region of the member 2 over which the electron beam 3 is to be deflected are indicated at 7 and 8. The electron beam 3 is assumed to exhibit the usual Gaussian form of intensity distribution in cross-section, and the arrangement is such that a fan of X-radiation is generated when the beam 3 impinges on the member 2 at any location between the points 7 and 8. The effect of scanning the electron beam 3 from 7 to 8 is thus to scan the origin of the fan of X-radiation from 7 to 8 in a plane across the member 2, as is described in more detail; for example, in the specification of U.S. Pat. No. 4,010,370 which is incorporated herein by reference.

In order to monitor the extent of the deflection of the electron beam 3 over the member 2, this invention provides a means of monitoring the X-radiation emitted from the vicinity of the points 7 and 8. In this example, a collimator 9 is disposed to receive radiation from the vicinity of point 7, defining a radiation path 10 which is wide enough at the member 2 to allow for the fact that the radiation does not originate from a point but from a region of finite dimensions related to the size of the electron beam 3 at its impingement on member 2. The radiation travelling along path 10 and thus through the collimator 9 is detected by a suitable radiation detector 11, such as a caesium iodide or sodium iodide scintillator with an associated photomultiplier or photodiode. It will be appreciated that the path 10 must be slightly inclined to the plane of the fan-shaped spreads of radiation, because radiation in the said plane is projected through a patient's body toward detector means arranged to determine the amount of attenuation suffered by the radiation on traversing many beam paths through the body in that plane. The collimator 9 and detector 11 are thus disposed out of the said plane to avoid obscuring the detector means arranged to determine said attenuation.

A similar arrangement, comprising a collimator 12 and a detector 13, is arranged to receive radiation along a path 14 from the point 8.

It is usual for the deflection of the electron beam 3 to be effected so that the beam sweeps steadily from 7 to 8 at one rate and then flies back, at a rate about 10 times faster, from 8 to 7. In these circumstances, if the radiation projected along paths 10 or 14 is considered for the forward scan (from 7 to 8) then the detector 11 or 13 will produce an output waveform of the kind shown in FIG. 2(*a*) if the beam is assumed to sweep right through the point 7 or 8 as the case may be. Likewise, if flyback is considered, the detectors 11 or 13 produce a sharper waveform of the kind shown in FIG. 2(*b*). If now the actual situation at point 8 is considered, the forward sweep will occur first followed by the flyback and thus if the reversal of scanning direction occurs, as is desired, close to the point 8, the output waveform provided by the detector 13 will have the shape shown in FIG. 2(*c*). It will be observed that this waveform consists of two peaks of substantially equal amplitude separated by a trough. The difference in amplitude between the peaks and the trough is used, in accordance with this example of the invention, to monitor the amplitude of the deflection applied to the beam 3.

The shape of the waveform shown in FIG. 2(*c*) is independent of the actual amplitude of the signal. If the so-called "full width half maximum", or briefly FWHM, of the X-ray intensity distribution across the region of the member 2 upon which the collimator 12 is focussed is known, the aforementioned difference can be calculated for specified amplitudes of scan. For example, if the collimator field of view at the member 2 is equal to said FWHM, then said difference is found to be 12% of the peak signal amplitudes for a deflection amplitude of ¼ of said FWHM beyond point 8.

Typically the electron beam 3 will be focussed to yield a FWHM of less that 0.04 inch, and thus the above condition of excess deflection amplitude corresponds to 0.01 inch beyond point 8. As the deflection is thus monitored, excess or insufficient deflection can be corrected. Similar considerations apply to the point 7, although the detector 11 will produce a waveform like that shown in FIG. 2(*d*) and which is reversed with respect to the one shown in FIG. 2(*c*).

FIG. 3 shows a block diagram of a circuit for monitoring the difference in amplitude between the peaks and troughs of waveforms such as those shown in FIGS. 2(*c*) and 2(*d*). The output signals from detector 13 (say) are applied in parallel to maximum and minimum detector circuits 15, 16 of known kind. Circuit 15 feeds a hold circuit 17 and circuit 16 feeds a hold circuit 18 and the two hold circuit are connected respectively to the non-inverting and inverting inputs of a differencing amplifier 19 of known kind. The output of amplifier 19 is fed to a threshold circuit 20 wherein the difference developed thereby is compared with a level indicative of an acceptable amplitude difference between peaks and trough. If the signal developed by the amplifier 19 substantially corresponds to the threshold level (i.e. it is within a few percent thereof) no error signal is developed and the deflection, at least as regards the vicinity of point 8, is allowed to remain unchanged. If the difference signal developed by the amplifier 19 exceeds or is exceeded by the threshold level to a greater extent than that referred to above, then the reversal point of the beam deflection is shifted in one direction or the other under the influence of an error signal of appropriate polarity applied to the deflection waveform generating circuits 6 from the threshold circuit 20.

A similar arrangement is provided for the point 7. Thus the two points of reversal of the beam deflection are accurately located. Once this has been done, the waveforms derived from the two detectors 11 and 13 can be further used to correct automatically the timing of the scanning by comparison with clock signals derived, for example, from a graticule and photocell/detector arrangement of known kind arranged to produce timing pulses indicative of the progress of the aforementioned steady rotational scanning movement of the tube 1 around the patient.

What I claim is:

1. An X-ray tube arrangement including an anode, means for generating an electron beam and directing it to be incident on said anode to generate X-rays at the region of incidence, means for deflecting the electron beam to scan repetitively the region of incidence between two positions at which the deflection is reversed, monitoring means arranged to monitor the intensity of X-rays emitted at two points, on the anode, in the vicinity of each of which a reversal is intended to occur and means for operating on the output of each monitoring means to estimate the variation of the position of the respective reversals from its intended position.

2. An arrangement according to claim 1 in which the means for operating includes means for detecting, for each monitoring means, maxima corresponding to passage of the said region before and after the corresponding reversal, means for detecting a minimum between the two maxima, and means for determining the amplitude change between the maxima and the minimum and the deviation of that change from a preset level to estimate said variation.

3. An arrangement according to claim 1 including wherein the means for operating on the output of the monitoring means is arranged to supply the estimate of said variation to the means for deflecting to correct the position of the reversal.

4. An X-ray tube arrangement including an anode, means for generating an electron beam and directing it to be incident on said anode to generate X-rays at the region of incidence, means for deflecting the electron beam to scan repetitively the region of incidence between two positions at which the deflection is reversed, monitoring means arranged to monitor the intensity of X-rays emitted at two points, on the anode, in the vicinity of which said reversal is intended to occur, detector means for determining maxima and minima in the intensity at each point to determine the magnitude of a trough, between two successive output peaks corresponding to emission of X-rays at that point, and means arranged to determine if the said magnitude exceeds a predetermined level and to control the deflecting means to move the reversal position if said magnitude exceeds said level.

5. A method of controlling an X-ray tube in which a beam of electrons is deflected in relation to the anode thereof to scan repetitively the region of incidence of the beam, and hence the origin of generated X-rays, along the anode, the method including monitoring the intensity of the radiation emitted at a point, on the anode, adjacent which the scan is to be reversed, determining maxima of the intensity caused by passage of said region across the point before and after a reversal adjacent the point, determining a minimum of the intensity between said maxima, determining if the change of amplitude between the minimum and the maxima differs from a prdetermined level and controlling said deflection to change the position of the reversal in response to the magnitude and sign of the difference from the predetermined level.

* * * * *